UNITED STATES PATENT OFFICE.

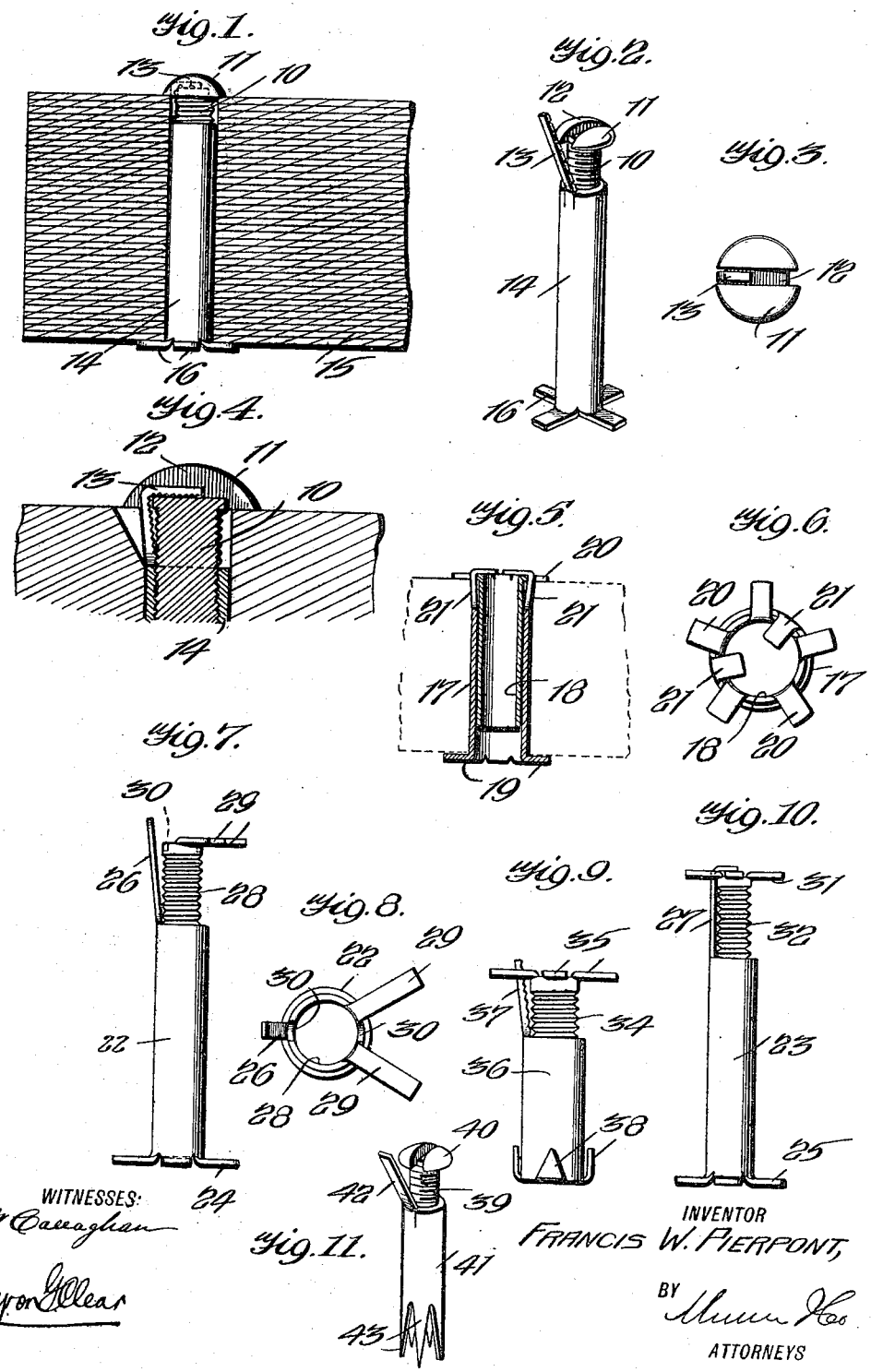

FRANCIS WILLIAM PIERPONT, OF PITTSBURGH, PENNSYLVANIA.

ADJUSTABLY-LOCKED FASTENER.

1,209,489.  Specification of Letters Patent.  Patented Dec. 19, 1916.

Application filed March 16, 1916. Serial No. 84,587.

*To all whom it may concern:*

Be it known that I, FRANCIS W. PIERPONT, a citizen of the United States, and a resident of Pittsburgh, in the county of Allegheny and State of Pennsylvania, have invented a certain new and useful Improvement in Adjustably-Locked Fasteners, of which the following is a specification.

My present invention relates generally to fasteners of the nature which extend through articles to be connected, without screw or other engagement with the articles except by clamping contact with the outer faces thereof, my primary object being to provide a fastener of this type including relatively adjustable members, one of which is provided with means engageable with the other and of a nature to be hereinafter described, whereby the two members may, after adjustment, be locked against displacement.

Another object of my invention is to provide a fastener having the locking feature above noted, which may by slight changes be adapted to a great variety of uses in connection with articles to be clamped.

Several of the forms of which my invention is susceptible, are shown in the accompanying drawing and will be better understood from the following description referring to the drawing, and in which latter Figure 1 is a sectional view illustrating the practical application of one form of my invention including a screw member generally of the nature of a button. Fig. 2 is a detail perspective view of the form shown in Fig. 1. Fig. 3 is a top plan view of the same. Fig. 4 is an enlarged detail section through the upper portion thereof in position in use. Fig. 5 is a sectional view through a modified form. Fig. 6 is a plan view of the form shown in Fig. 5. Fig. 7 is a side view of another modified form. Fig. 8 is a plan view of the form shown in Fig. 7. Figs. 9 and 10 are side views of other slightly modified forms. Fig. 11 is a perspective view of still another modified form.

Referring now to these figures, and particularly to Figs. 1 to 4 inclusive, one of the relatively adjustable members, as indicated at 10, is substantially in the nature of a bolt, threaded therealong and provided at its outer end with a head 11, this head being provided with a transverse slot 12 for the reception of the locking finger 13 projecting from the inner end of the other member 14. This latter member 14 is, in this instance, in the nature of a tubular nut threaded for the screw engagement of the bolt 10, and the finger 13 of which, just before mentioned, is adapted to be bent into the slot 12 of the head 11 as shown in Fig. 1, in order to lock the relatively adjustable members 10 and 14 in clamping engagement with the opposite faces of parts to be connected and through which the members extend, such as a series of superposed leaves and the like, as indicated at 15 in Fig. 1, the tubular member 14 being provided at its outer end with a head of suitable nature to oppose the head 11 in the clamping action and which may be formed by slitting the corresponding end of the member 14 and bending the resulting integral lugs 16 thereof at right angles.

In Fig. 5 the relative adjustable members are in the form of telescoping tubes 17 and 18, unthreaded and for this reason adjustable relatively to one another without turning either, both of the said members having their outer ends headed by slitting the same and bending outstanding lugs 19 and 20 respectively at right angles thereto, the outer tubular member 17 having locking fingers 21 projecting from its inner end to be bent as shown in Fig. 5, into engagement with the head of the other member 18 to lock the members against displacement, substantially as before described in connection with the form shown in Figs. 1 to 4 inclusive.

In Figs. 7 and 10 the outer tubular members 22 and 23 respectively are constructed substantially like the outer tubular member 14, in the form shown in Figs. 1 to 4 inclusive, respectively having outer heads 24 and 25 and inner locking fingers 26 and 27. In Fig. 7 the inner member is also tubular with external threads 28 engageable within the threaded outer member 22 and has an outer clamping head 29 formed by lugs bent at right angles thereto, the locking finger 26 being bendable into recesses 30 between such lugs, and there being lugs less in number than the lugs 31 formed at the outer end of the inner threaded member 32 in Fig. 10.

In Fig. 9 the inner threaded member 34 is similar, in all respects, to the inner threaded member in Fig. 10, having its outer head formed by lugs 35, while the outer tubular member 36 though provided at its inner end with the locking finger 37 as usual, has pointed lugs 38 at its outer end bent back thereon as shown, so that they may be driven into the material of one of two articles to be connected immediately surrounding the opening through the article into which the fastening is projected.

In the form shown in Fig. 11, the inner screw member 39 has a slotted head 40 and is constructed similar to the inner member 10, in the form shown in Figs. 1 to 4 inclusive, and in this form also the outer tubular member 41 has at its inner end a locking finger 42 and at its outer end is cut away to form tapering prongs 43 adapted to be driven into the base of a bore for the reception of member 41 in plaster, wood, and like material.

Thus it will be appreciated that the provision of one of a pair of relatively adjustable fastening members with a locking finger at its inner end for engagement with the other of said members to prevent their accidental displacement, from adjusted position, is capable of being carried through a very wide range as regards the particular construction of the two relatively adjustable fastening members with respect to their adjustment toward and away from one another and their connection with the articles to be secured or connected through their use.

I claim:—

1. A fastener of the character described comprising a pair of relatively adjustable fastening members threaded in connection with one another, and each of which is provided with engaging means at its outer end, one of said members being tubular in form to receive the other member and having an integral locking finger projecting from its inner end for engagement with the other member to prevent relative displacement of said members in adjusted position.

2. A fastener of the character described comprising a pair of relatively adjustable members, one of which is tubular and internally threaded and the other of which is externally threaded to screw within the first member, and is provided at its outer end with a slotted head, said tubular member being provided at its inner end with an integral locking finger bendable into engagement with the slot of the head of the other member whereby to prevent relative displacement of the members in adjusted position.

FRANCIS WILLIAM PIERPONT.

Witnesses:
C. E. WILBUR,
THOMAS D. JONES.

Copies of this patent may be obtained for five cents each, by addressing the "Commissioner of Patents, Washington, D. C."